United States Patent

Berger

[15] 3,665,914

[45] May 30, 1972

[54] FIRE SAFETY DEVICE FOR ELECTRIC COOKING UNIT

[72] Inventor: Victor M. Berger, 200-17 50th Ave., Bayside, N.Y. 11364

[22] Filed: June 16, 1971

[21] Appl. No.: 153,634

[52] U.S. Cl. ........................... 126/41 R, 126/299 B, 34/54, 48/192, 99/422, 220/88, 222/189, 219/261, 219/400, 219/524
[51] Int. Cl. ........................................ A47j 37/06, F24c 7/08
[58] Field of Search .................. 219/400, 261, 378, 462, 279, 219/460, 525, 524; 126/19, 41 R, 299 A, 274, 299 B; 34/54, 55; 48/192; 236/10, 15, 11; 220/88; 222/189; 99/251, 422; 23/255

[56] References Cited

UNITED STATES PATENTS

| | | | |
|---|---|---|---|
| 2,508,588 | 5/1950 | Waltman | 48/192 X |
| 2,674,991 | 4/1954 | Schaefer | 126/199 A |
| 2,866,883 | 12/1958 | Borden | 219/261 X |
| 2,898,437 | 8/1959 | McFarland | 219/400 X |
| 2,919,340 | 12/1959 | Jacobs | 126/299 B |
| 2,957,973 | 10/1960 | Torrez | 219/525 X |
| 3,131,688 | 5/1964 | Lipstein | 126/299 |
| 3,209,712 | 10/1965 | Arena | 110/1 |
| 3,413,443 | 11/1968 | Britt | 219/400 X |
| 3,423,568 | 1/1969 | Meckley et al. | 219/279 |
| 3,537,442 | 11/1970 | Berger | 126/299 |

*Primary Examiner*—Volodymyr Y. Mayewsky
*Attorney*—Jerome Bauer, et al.

[57] ABSTRACT

An electric cooking unit with a down-draft induced air flow in which the fire hazard potential of the air flow is effectively minimized by a closure member which, in its closed position, terminates the air flow. The closure member is arranged in a removable container of the unit which does not interfere with achieving the aforesaid safety feature, and yet also permits the container to be readily transported to a remote washing station to thereby facilitate cleaning the cooking unit.

2 Claims, 4 Drawing Figures

INVENTOR
VICTOR M. BERGER

BY Bauer & Amer
ATTORNEYS

Patented May 30, 1972
3,665,914
2 Sheets-Sheet 2
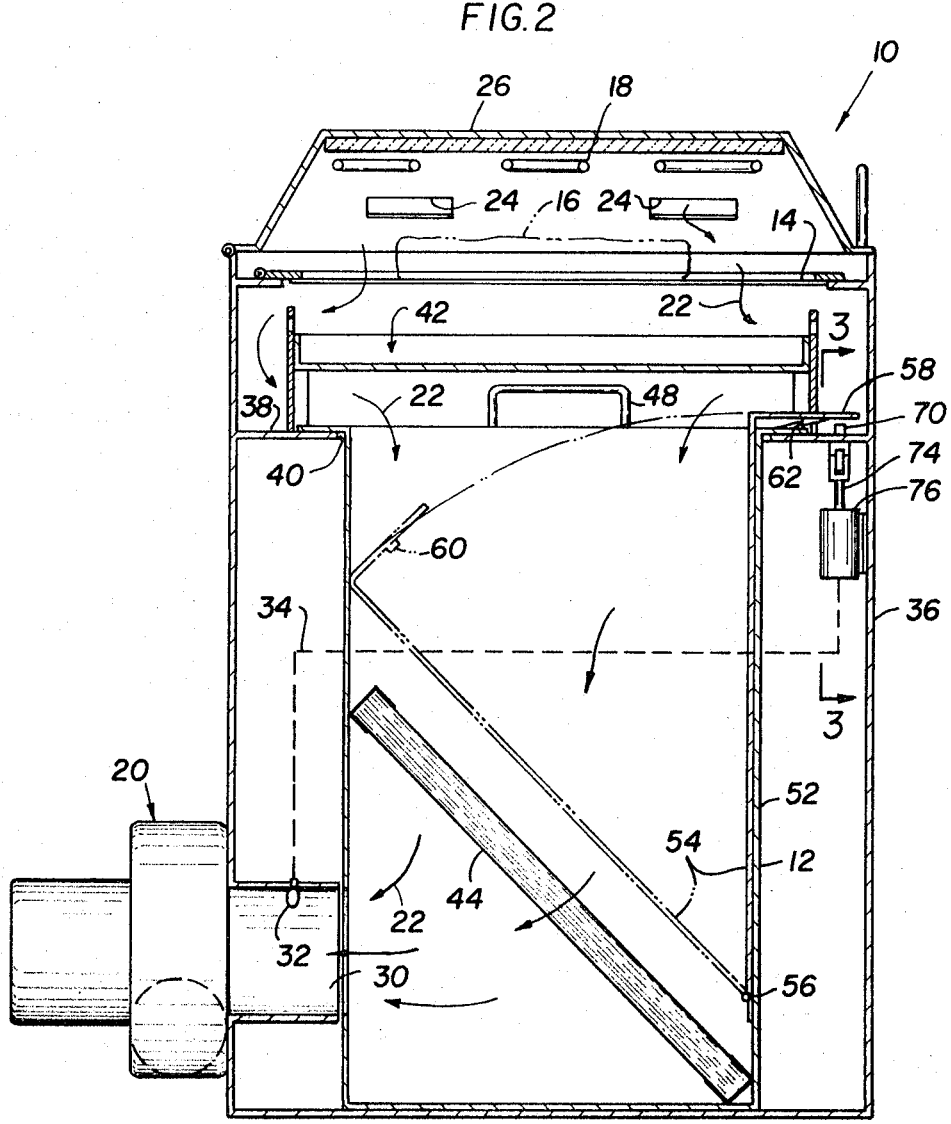
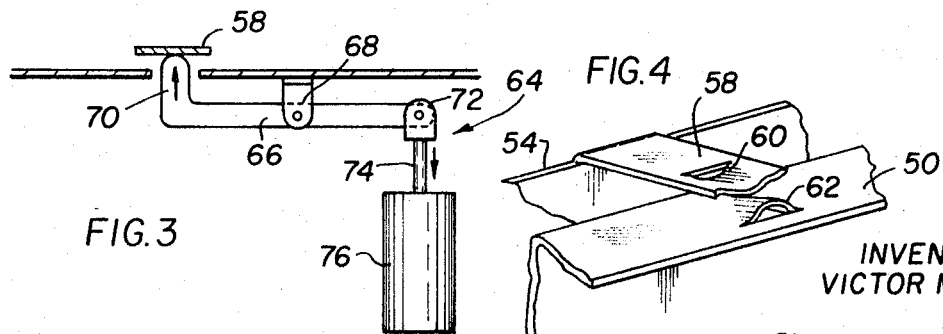
INVENTOR
VICTOR M. BERGER
BY Bauer & Amer
ATTORNEYS

FIRE SAFETY DEVICE FOR ELECTRIC COOKING UNIT

The present invention relates generally to an improved electric cooking unit, and more particularly to an electric cooking unit with improved means to both minimize any hazardous fire during its use and also to facilitate cleaning of the unit.

Electric cooking units, as exemplified by the unit of U. S. Pat. No. 3,537,442, can and, in practice, do make effective use of a down-draft air flow to remove smoke and heat from the cooking surface. This air flow, as a precautionary measure, should be terminated in the event that fire occurs along the air flow path since it would effectively serve to help extinguish the fire.

Broadly, it is an object of the present invention to provide means to so manage the smoke-removal air flow of an electric cooking unit as to minimize fire hazardous use thereof. Specifically, it is an object to achieve both the aforesaid fire safety feature and also to contribute to facilitated use of the unit, as for example, by simplifying the cleaning of the unit.

An electric cooking unit with fire safety control demonstrating objects and advantages of the present invention includes a combination air conduit and container in a strategic location for channeling the air flow between its originating and terminating points. A closure member, functioning somewhat like a damper, is arranged in the container to provide shut-off of the air flow therethrough in response to the detection of a hazardous fire condition. The container is also left portable, or without actual physical attachment to its support, so it is readily removable to a remote washing station. Thus, although the air flow is likely to carry grease or the like in a vapor state, the grease accumulating in the container poses no problem because the container is so easily cleaned.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 2 is a sectioned side elevational view of the cooking unit illustrating further structural details thereof, and wherein positions of movement of a closure member of a fire safety device of the cooking unit are illustrated in full line and phantom perspective;

FIG. 3 is a side elevational view, in section taken on line 3—3 of FIG. 2, illustrating an exemplary unlatching mechanism for the closure member hereof; and FIG. 4 is a perspective view illustrating the manner in which the closure member is latched and unlatched.

Figure 1:
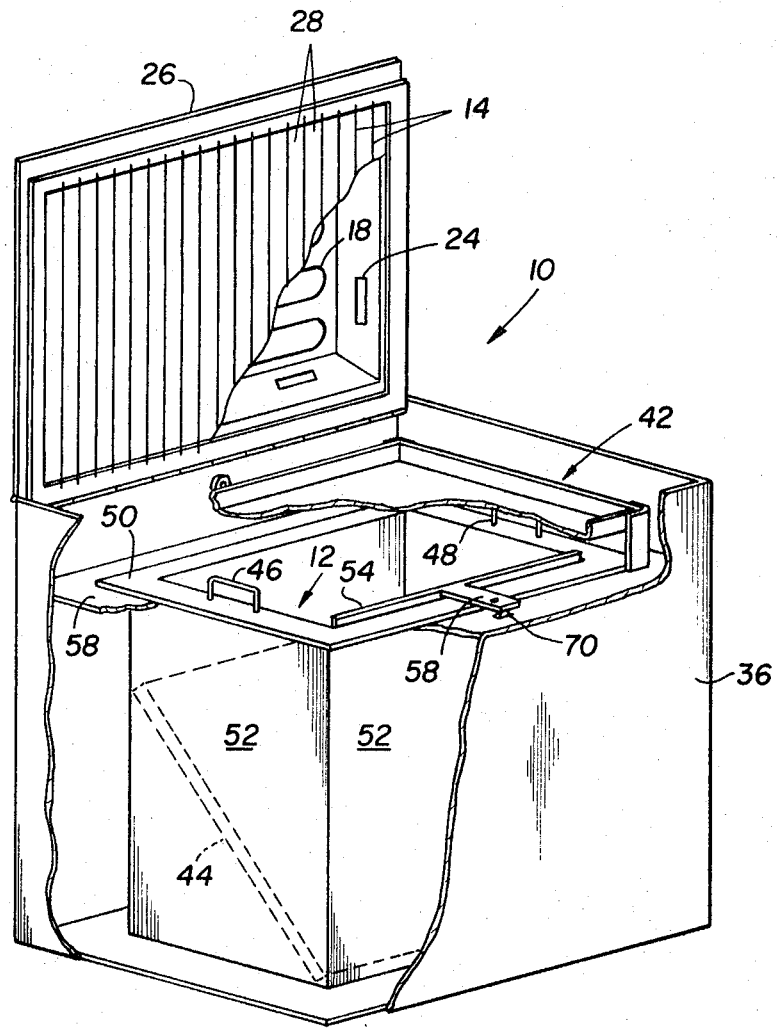
FIG. 1 is a perspective view of the cooking unit hereof with portions thereof broken away to better illustrate internal structural features thereof.

Reference is now made to the drawings wherein there is shown a cooking unit, generally designated 10, which, according to the present invention, has a noteworthy fire safety device made up, in part, of a removable container 12. The significance of the removability of the container 12 is that it greatly facilitates cleaning and otherwise ridding the cooking unit 10 of any grease or the like which unavoidably accumulates, particularly in the container 12, during cooking use of the unit 10. The foregoing will become readily apparent as the description proceeds.

As is perhaps best appreciated by reference to FIGS. 1, 2, cooking unit 10 utilizes as its cooking surface an electric grate 14 for directly supporting the food, which may be a cut of meat 16, during the cooking thereof. An electric coil 18 may be advantageously located above the meat 16 to accelerate or shorten the cooking interval. Additionally, the operation and construction of the electric cooking unit 10 hereof, as is well understood, as for example from U. S. Pat. No. 3,537,442, includes an air blower 20 or other effective down-draft means which, in operation, produces a down-draft or air flow, herein represented by the plural arrows individually and collectively designated 22, which removes smoke and heat from the cooking area adjacent the food or meat 16 being cooked. Essentially, air flow 22 originates at openings 24 in a pivotally mounted hood 26 and proceeds downwardly through the spaced openings 28 in the electric grate 14, and through the interior of the previously noted container 12 which serves as an air flow passageway, and ultimately enters the inlet 30 of the blower 20. In the operation of an electric cooking unit, such as cooking unit 10 hereof, it has been found advisable, in order to meet safety regulations and also to minimize fire hazards, to terminate the air flow 22 in the event that any fire is detected in the inlet 30 or in the equivalent thereof which may be a conduit to a remotely located air blower 20 which induces and creates the air flow 22. To this end, there is provided a conventional flame or heat sensor 32 advantageously located in the inlet 30 which is effective in detecting fire and, in response to such detection, emits an electrical signal through a conductor 34 which, in accordance with the present invention, terminates the air flow 22.

More particularly, in terminating the air flow 22 in response to the detection of a fire in the inlet 30, noteworthy advantage is taken of the fact that the container 12 effectively functions as a passageway for the air flow 22, all as will now be explained in detail. Referring to FIG. 1, it will be noted that horizontally oriented adjacent the electric grate 14 within the interior of the housing 36 for the unit 10 is a support surface 38 having a central mounting opening 40 (see FIG. 2) therein. Arranged on the support surface 38 in a clearance position above the opening 40 is a grease pan 42 which receives grease, in liquid form, which drips from the meat 16 during the cooking thereof. Grease in vapor form, however, in addition to smoke, is carried by the air flow 22 around the grease pan 42, through the inlet opening 40, into the interior of the container 12, and through the filter 44, which is angularly inclined in the container 12, as illustrated, across the lower inlet opening 30. Consequently, both the filter 44 and, in fact, the entire container 12 often has an accumulation of grease which must be removed. This is greatly facilitated by the fact that the container 12 is readily removable from its depending position within the opening 40 of the support surface 38. That is, since there is nothing physically attaching container 12 in its illustrated position, the same can be readily removed to a remote washing station. To facilitate this removal, there are hand grips 46 and 48 on opposite sides of the peripheral lip 50 which bounds the container opening 40 and which supports the container 12 in its depending position on the support surface 34.

Container 12, in addition to being portable to a remote washing station in the manner just described, also, as previously indicated, provides a noteworthy fire safety device. In accordance with the present invention, on the interior of the side walls, individually and collectively designated 52 of the container 12, there is provided a closure member 54. Specifically, closure member 54 is pivotally connected, as at 56, a short distance above the base of the container 12. Thus, member 54 is pivotally movable between an open position with respect to the interior of the container 12, as illustrated in full line in FIG. 2, and a closed position relative thereto, as illustrated in phantom perspective in FIG. 2. Moreover, it will be understood that disposed about the pivot 56 there is a helical spring (not shown) normally biasing or urging member 54 through that direction of pivotal movement from its open into its closed position. In lieu of a helical spring, a leaf spring or some other means of biasing the member 54 could also be employed in accordance with the invention.

However, the member 54 is ordinarily held in its open position. This is preferably achieved by latching the member 54 in its open position. Thus, on a horizontally oriented extension 58 of member 54, there is a depending latching projection 60. Projection 60 engages a cooperating upstanding holding projection 62 formed in the lip 50 of container 12. However, as clearly illustrated in FIG. 3, at a point beyond the engagement of the projections 60 and 62, extension 58 overhangs an unlatching mechanism, generally designated 64. Mechanism 64 includes a lever 66 pivotally mounted, as at 68, on the support surface 38 and having an unlatching end 70 adjacent the overhanging extension 58. The other end of lever 66 is connected, as at 72, to a plunger 74 of a solenoid 76. Solenoid 76, in turn, is electrically connected via the previously noted conductor 34 to the sensor 32 such that upon the detection of a fire in the inlet 30 an electrical impulse is transmitted to the solenoid 76 and operates the same. The contemplated operation of solenoid 76 is the retraction of plunger 74 and unlatching movement of end 70 of lever 66 against the flexible extension 58. This has the effect of disengaging the projections 60 and 62 from each other and freeing the member 54 for pivotal movement under spring urgency about the pivot axis 56 from its open into its closed position diagonally across the interior of the container 12. In the closed position of the member 54, it blocks continued air flow 22 into the inlet 30 and thus starves any fire therein of oxygen which has the obvious effect of extinguishing the fire. Other additional and supplementing means of minimizing fire hazard can also be employed, such as the inclusion of sensors to terminate cooking operation of the unit 10, as well as to terminate operation of the blower 20. Thus, the use of closure member 54 to terminate air flow 22, used alone or in combination with any of the aforesaid conventional fire safety devices and procedures, greatly contributes to the safety and thus the utility of the cooking unit 10 hereof.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An electric cooking unit comprising an outer housing having means defining a cooking chamber in the upper portion thereof, an electric cooking means and a horizontally oriented grate serving as a food-supporting surface in said cooking chamber, a horizontally oriented support surface having a mounting opening therein located beneath said grate, down-draft means having an inlet opening and located at a remote location below said support surface and operatively arranged to induce air flow downwardly from said cooking chamber through said grate and into said inlet opening thereof, a generally rectangular container having side walls bounding the interior thereof removably disposed in depending relation in said mounting opening of said support surface such that said interior thereof serves as a passageway for said air flow between said cooking chamber and said downdraft means, a closure member pivotally mounted in said interior of said container and pivotally movable between open and closed positions relative to said passageway of said container, latching means operatively effective to normally latch said closure means in said open position thereof, and fire sensor means connected in controlling relation to said latching means so as to cause the unlatching of said closure member and the movement of said closure member into said closed position responsive to the detection of any hazardous fire condition during the operation of said cooking unit, whereby said air flow which may be aiding said fire is terminated upon the movement of said closure member into said closed position thereof.

2. An electric cooking unit as defined in claim 1 wherein said container side walls bound an inlet opening adjacent said cooking chamber which opens into said interior thereof and one said side wall has an exit opening adapted to align with said down-draft means inlet opening.

* * * * *